(12) United States Patent
Fujii et al.

(10) Patent No.: US 9,223,115 B2
(45) Date of Patent: Dec. 29, 2015

(54) IMAGE PICKUP LENS UNIT

(75) Inventors: Takashi Fujii, Hachioji (JP); Takemi Miyazaki, Hamura (JP); Akihiko Matsumoto, Hino (JP); Hajime Mori, Fuchu (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 173 days.

(21) Appl. No.: 13/518,738

(22) PCT Filed: Dec. 15, 2010

(86) PCT No.: PCT/JP2010/072531
§ 371 (c)(1),
(2), (4) Date: Jun. 22, 2012

(87) PCT Pub. No.: WO2011/078023
PCT Pub. Date: Jun. 30, 2011

(65) Prior Publication Data
US 2012/0262805 A1    Oct. 18, 2012

(30) Foreign Application Priority Data

Dec. 25, 2009   (JP) .................................. 2009-293857

(51) Int. Cl.
*G02B 9/00*   (2006.01)
*G02B 7/02*   (2006.01)
*G02B 13/00*  (2006.01)

(52) U.S. Cl.
CPC .................................. *G02B 13/001* (2013.01)

(58) Field of Classification Search
USPC .......................... 359/739, 808, 811, 819, 740
See application file for complete search history.

(56) References Cited

FOREIGN PATENT DOCUMENTS

| JP | 56-149010 | 11/1981 |
|----|-----------|---------|
| JP | 08-271775 | 10/1996 |
| JP | 09-281374 | 10/1997 |
| JP | 2001-051177 | 2/2001 |
| JP | 2008-221565 | 9/2008 |
| JP | 2009-098614 | 5/2009 |
| JP | 2009-104100 | 5/2009 |
| JP | 2009-139702 | 6/2009 |
| JP | 2009-251302 | 10/2009 |

OTHER PUBLICATIONS

Office Action dated Jan. 3, 2014 (and an English Translation thereof) issued in the corresponding Chinese Patent Application No. 201080058493.4.

*Primary Examiner* — Jack Dinh
(74) *Attorney, Agent, or Firm* — Cozen O'Connor

(57) ABSTRACT

Image pickup lens unit (100) comprises, in order to minimize the positional displacement between an optical system and a holder therefor, compound lens (6), holder (2) which houses compound lens (6) therein, and cover (4) which covers compound lens (6). In holder (2), there is formed peripheral section (2e) which restricts the movement of compound lens (6) in the XY-direction. In cover (4), there is formed projecting section (4e) which restricts the movement of compound lens (6) in the Z-direction.

22 Claims, 11 Drawing Sheets

IMAGE PICKUP LENS UNIT

TECHNICAL FIELD

The present invention relates to an image pickup lens unit.

BACKGROUND ART

Conventionally, there are known technologies to mold a resin optical system (a lens or a compound lens) and its holder (casing), a cover (lid) within the same mold and to assembly those members (for example, Patent Literature 1).

According to the technology of Patent Literature 1, an optical system (lenses 35, 37), a holder (cylindrical frame 33) and cover (lid 38) are simultaneously molded, and the optical system is inserted into the holder, which has been molded, with the movement of movable mold (4) under the condition that the optical system and the cover are left on fixed mold (3), then the cover is bonded to the holder (paragraphs 0026-0032).

CITATION LIST

Patent Literature

Patent Literature 1: JP-A No. 2008-221565

SUMMARY OF INVENTION

Technical Problem

As for an image pickup lens unit which has a structure that an optical system is housed in a holder and covered with a cover, it is required to make the optical axis of the optical system and the centers of the opening sections of the holder and the cover (stops) agree with each other. In an assembling step of the optical system, its holder and its cover, extremely high positioning accuracy is required.

However, according to the technology of Patent Literature 1, there is provided a structure that at the same time to the molding step of the optical system, its flange (lens holders 35*h*, 37*h*) is molded and that the optical system is inserted into a holder with using the outer circumference of the flange as a reference. Therefore, they are needed to be formed with accuracy such that the outer circumference of the flange to be the reference agree with the optical axis of the lens section and that an inner wall of the holder which touches the outer circumference of the lens to be inserted, the center of the inner wall and the optical axis of the lens part agree with each other. However, in a small image pickup lens unit whose resolution is becoming furthermore higher, for example, in an image pickup lens unit for a camera of a cell phone, it is extremely difficult to form their surface with high accuracy with corresponding to the requirement.

In recent years, the following method to produce a large number of image pickup lens units simultaneously is being considered as a production technology of such the small-sized image pickup lens unit. Instead of producing optical lenses by molding them individually, a wafer lens technology for which a production method of semiconductor is applied is used. In other words, a large number of fine lens forms are molded simultaneously to form a wafer lens, and plural wafer lenses are layered if it is required, then, the resulting body is cut into pieces to produce a large number of image pickup lens units each of which includes plural optical lenses which are layered and can handle a high resolving power.

In this case, it is naturally understood that this method is not suitable for the step of molding a lens in the mold, in Patent literature 1 as described above. Further, since a wafer lens is cut into pieces to obtain individual image pickup lens units, the side surface of the image pickup lens becomes a cut surface and its surface accuracy is low. Therefore, it is difficult that such the image pickup lens is positioned in a lens holder by using the outer circumference of the image pickup lens as a reference.

Therefore, a primary object of the present invention is to provide an image pickup lens unit wherein an optical system which copes with a high resolving power can be positioned in its holder with accuracy and ease.

Solution to Problem

To solve the above problem, the first embodiment of the present invention provides an image pickup lens unit comprising:
an image pickup lens; and
an exterior body covering the image pickup lens from outside and including a holder and a cover as structural elements.

The image pickup lens unit is characterized in that the image pickup lens
comprises a first lens section including an area from an optical axis to an effective aperture thereof, and a first non-lens section arranged outside the first lens section, which are arranged on a surface closest to an object side in the image pickup lens, and
comprises a second lens section including an area from the optical axis to an effective aperture thereof, and a second non-lens section arranged outside the second lens section, which are arranged on a surface closest to an image side in the image pickup lens, and
the image pickup lens is positioned in the exterior body by arranging an outer circumference surface of the image pickup lens with a gap between the outer circumference surface and an inner surface of the exterior body and by making the exterior body in contact with the second lens section and the surface closest to the object side which are arranged inside the exterior body.

The second embodiment of the present invention provides an image pickup lens unit comprising:
an image pickup lens;
a holder holding the image pickup lens; and
a cover covering the image pickup lens.

The image pickup lens unit is characterized in that the image pickup lens
comprises a first lens section including an area from an optical axis to an effective aperture thereof and including a part projecting at least toward an object side at an outside of the effective aperture thereof, and a first non-lens section arranged outside the first lens section, the first lens section and the first non-lens section being arranged on a surface closest to an object side of the image pickup lens, and
comprises a second lens section including an area from the optical axis to an effective aperture thereof which is larger than the effective aperture of the first lens section and includes a part projecting at least toward an image side at an outside of the effective aperture thereof, and a second non-lens section arranged outside the second lens section, the second lens section and the second non-lens section being arranged on a surface closest to an image side in the image pickup lens, the holder comprises a first opening section including a first contacting section and an inclining surface, the first contacting section having a ringed shape and coming in contact in a direction perpendicular to the optical axis from outside with the part projecting more than the second non-lens section toward the image side in the second lens section, the inclining surface inclining so as to make an opening smaller in a direction from the object side to the image side, and the holder further comprises a second opening section having a size such that the image pickup lens can be inserted into the holder through the second opening section, the cover comprises a third opening section for making light enter the image pickup lens, and a second contacting section having a ringed shape and coming in contact in an direction of the optical axis with an area on a surface at the object side of the first lens section, the area being at an outside of the effective aperture of the first lens section, and a center of the first contacting section agrees with the optical axis of the image pickup lens at an inside of the holder and the cover.

The third embodiment of the present invention provides an image pickup lens unit comprising:

an image pickup lens;

a holder holding the image pickup lens; and a cover covering the image pickup lens.

The image pickup lens unit is characterized in that the image pickup lens comprises a first lens section including an area from an optical axis to an effective aperture thereof and including a part projecting at least toward an object side at an outside of the effective aperture thereof, and a first non-lens section arranged outside the first lens section, the first lens section and the first non-lens section being arranged on a surface closest to an object side of the image pickup lens, and comprises a second lens section including an area from the optical axis to an effective aperture thereof which is larger than the effective aperture of the first lens section and includes a part projecting at least toward an image side at an outside of the effective aperture thereof, and a second non-lens section arranged outside the second lens section, the second lens section and the second non-lens section being arranged on a surface closest to an image side in the image pickup lens, the holder comprises a first opening section including a first contacting section and an inclining surface, the first contacting section having a ringed shape and coming in contact in a direction perpendicular to the optical axis from outside with the second non-lens section, the inclining surface inclining so as to make an opening smaller in a direction from the object side to the image side, and the holder further comprises a second opening section having a size such that the image pickup lens can be inserted into the holder through the second opening section, the cover comprises a third opening section for making light enter the image pickup lens, and a second contacting section having a ringed shape and coming in contact in an direction of the optical axis with an area on the surface closest to the object side in the image pickup lens, the area being at an outside of the effective aperture of the surface closest to the object side, and a center of the first contacting section agrees with the optical axis of the image pickup lens at an inside of the holder and the cover.

Herein, "a lens section including a part projecting toward an object side" naturally includes an ordinal lens which is convex toward the object side throughout in the area from the optical axis to the periphery. Additionally, the lens section also includes a lens section which forms a lens being concave toward the object side around the optical axis and changing its shape from concave to convex at the periphery. Similarly, "a lens section including a part projecting toward an image side" naturally includes an ordinal lens which is convex toward the image side throughout in the area from the optical axis to the periphery. Additionally, the lens section also includes a lens section which forms a lens being concave toward the image side around the optical axis and changing its shape from concave to convex at the periphery.

Advantageous Effects of Invention

According to the present invention, by using a surface form such as a part of a lens section having relatively high surface accuracy among lenses forming an image pickup lens, a positioning process such as the optical-axis alignment can be carried out with accuracy in a space formed by the holder and the cover. Therefore, even in a small-sized image pickup lens unit which requires positioning with high accuracy with corresponding to a high resolution power, high positioning accuracy can be achieved. Further, even when the lens unit is produced with a technology, such as the wafer technology, that a large number of lens units are simultaneously produced by a process of cutting the wafer lens into pieces, the high positioning accuracy can be achieved similarly because the positioning process does not carried out by using a part with low surface accuracy such as the external form of the image pickup lens.

DESCRIPTION OF EMBODIMENTS

Figure 1:
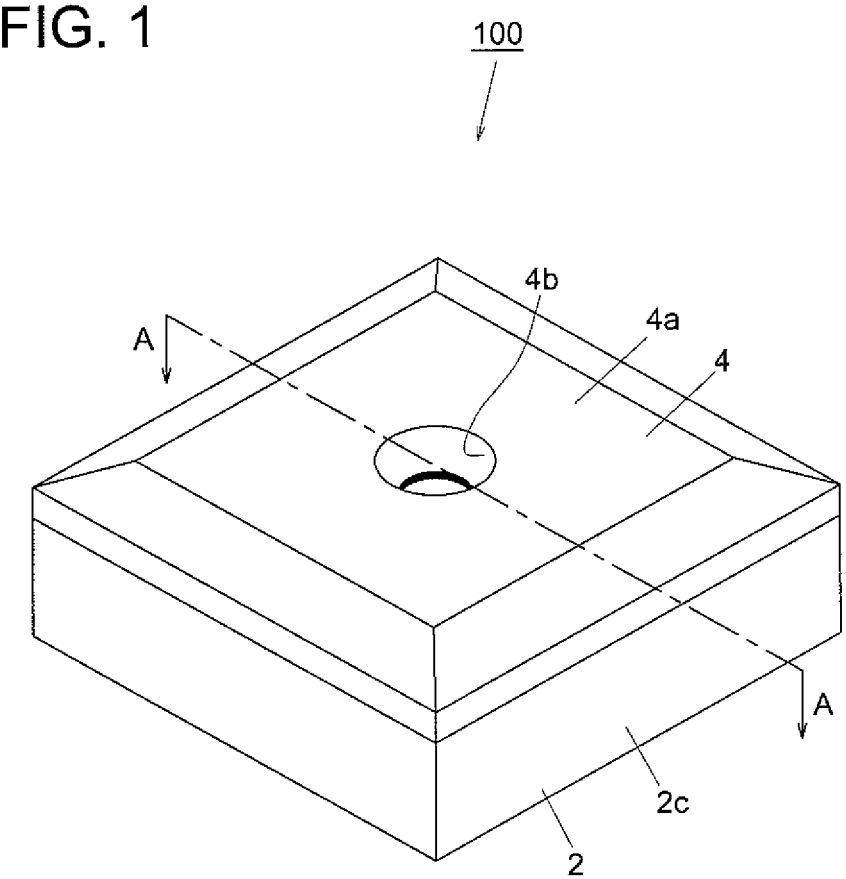
FIG. 1 shows a perspective view illustrating a schematic structure of an image pickup lens unit.
Figure 1:
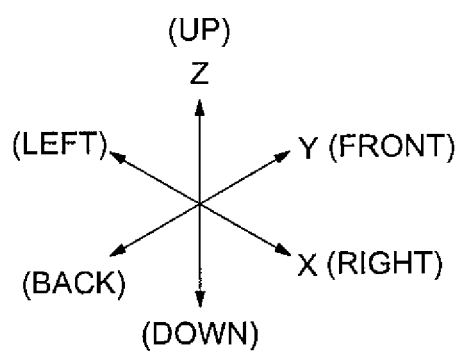

Next, preferable embodiments of the present invention will be described, referring to the drawings.

As shown in FIG. 1, image pickup lens unit 100 includes holder 2 and cover 4, and has a structure that holder 2 and cover 4 houses a compound lens therein. Holder 2 and cover 4 are structural elements of an exterior body which covers the compound lens from outside.

In other words, the exterior body covers, holds and houses a compound lens therein, and includes holder 2 and cover 4 as primary structural elements. However, it does not mean that the exterior body including other members is excluded from the scope of the invention.

Holder 2 is in a shape of a box whose top surface opens. Holder 2 is formed of resin and preferably is formed of a material having durability against a reflow processing.

Figure 2:
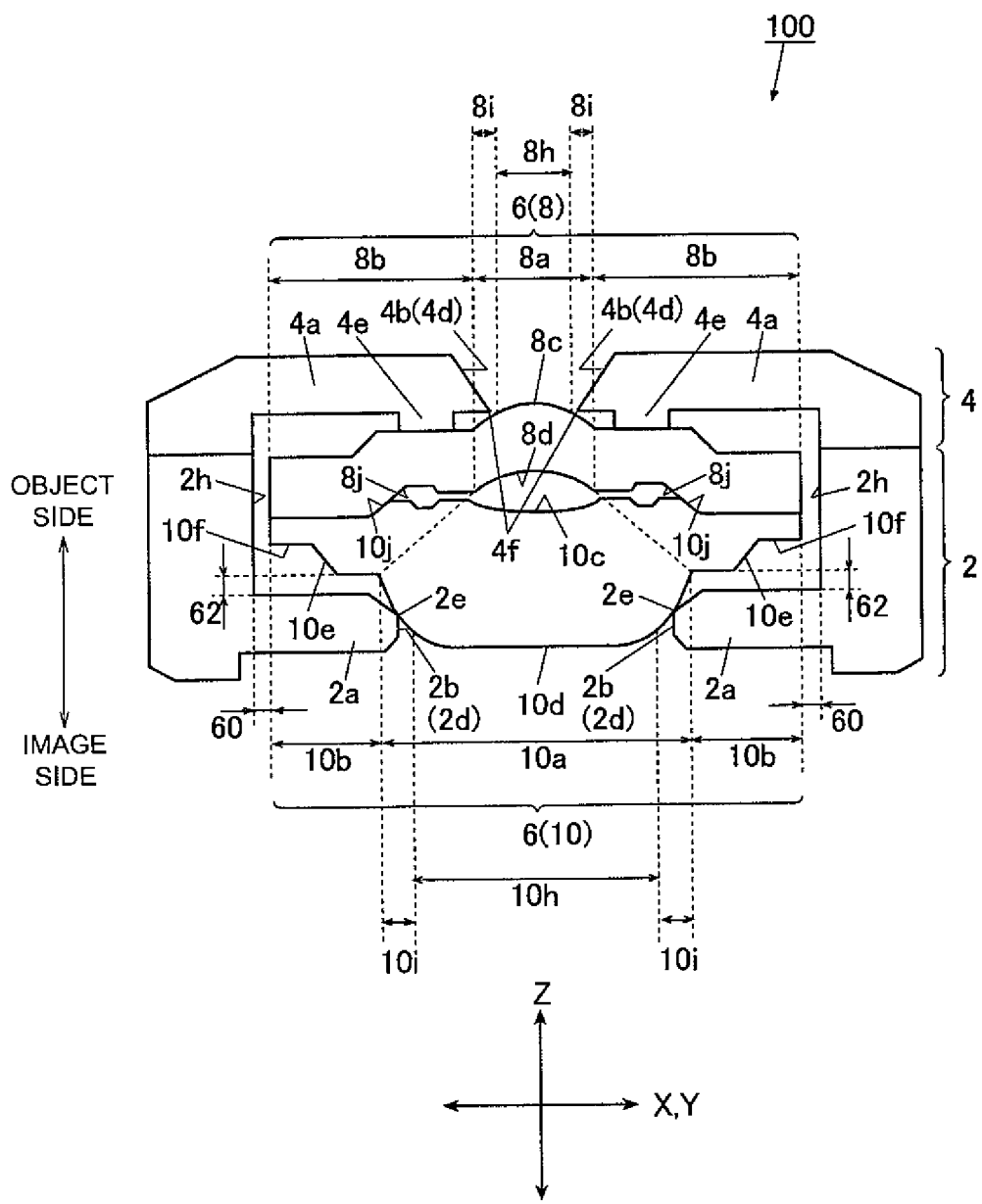
FIG. 2 shows a sectional view taken along line A-A in FIG. 1.

As shown in FIG. 2, on holder 2, there is formed opening section 2h through which compound lens 6 can be inserted into the holder. On bottom section 2a of holder 2, there is formed opening section 2b having a circle shape. Bottom section 2a is formed into one body with a side wall of holder 2 (side section 2c shown in FIG. 3). Bottom section 2a protrudes from the side wail toward the inside, and supports compound lens 6.

Cover 4 is arranged on the top of holder 2 and covers opening section 2h of holder 2. Similarly, cover 4 is made of resin and preferably is formed of a material which has durability against a reflow processing.

On top plate section 4a of cover 4, there is formed opening section 4b having a circle shape for making light enter compound lens 6. Top plate section 4a is formed into one body with a side wall of cover 4 (side section 4c in FIG. 3). Top plate section 4a covers compound lens 6 with its part excluding opening section 4b.

Compound lens 6 is an example of an image pickup lens.

Hereinafter, detailed descriptions will be provided by using a compound lens (lens unit) composed of two lenses as an image pickup lens. However, the scope of the present invention is not limited to the structure. In other words, in the present invention, it may be a single lens, or a compound lens (lens unit) wherein three or more lenses are joined together.

Compound lens 6 is composed of meniscus lens 8 whose convex surface faces the object side and a meniscus lens 10 whose convex surface faces the image side, which are joined to be one body.

Meniscus lens 8 is arranged at the object side and meniscus lens 10 is arranged at the image side.

Each of meniscus lenses 8, 10 is formed of glass or resin, and is preferably formed of a material having durability against a reflow processing.

Meniscus lens 8 is composed of lens section 8a and non-lens section 8b (flange). Lens section 8a includes an area from the optical axis to the outside of the effective aperture thereof as part thereof. Non-lens section 8b is arranged outside lens section 8a.

In lens section 8a, convex lens section 8c and concave lens section 8d are formed. Convex lens section 8c is formed on the object side of the lens section 8a and is exposed from opening section 4b of cover 4. Opening section 4b of cover 4 includes a part having a function to regulate the amount of incident light as stop 4d. Concave lens section 8d is formed on the image side of lens section 8a Each of convex lens section 8c and concave lens section 8d is in an aspheric surface shape.

Meniscus lens 10 is also composed of lens section 10a and non-lens section 10b (flange). Lens section 10a has a diameter which is larger than that of lens section 8a of meniscus lens 8. Similarly to lens section 8a, lens section 10a includes an area from the optical axis to the effective aperture thereof as part thereof. Non-lens section 10b is arranged outside lens section 10a.

In lens section 10a, concave lens section 10c and convex lens section 10d are formed. Concave lens section 10c is formed on the object side of the lens section 10a and faces concave lens section 8d. Convex lens section 10d is formed on the image side of lens section 10a and is exposed from opening section 2b of holder 2. Opening section 2b of holder 2 also includes a part having a function to regulate the amount of incident light as stop 2d. Each of concave lens section 10e and convex lens section 10d is in an aspheric surface shape.

However, each of convex lens section 8c, concave lens section 8d, concave lens section 10c and convex lens section 10d is not always limited to have an aspheric surface shape, and may have another shape such as a sphere shape and a shape on which a fine convex-and-concave shape is added so as to provide a phase difference to incident light In compound lens 6, slope section 8j is formed on the image side of meniscus lens 8 and slope section 10j is formed on the object side of meniscus lens 10. Slope sections 8j, 10j are joined together to form compound lens 6.

Slope section 8j of meniscus lens 8 is formed outside lens section 8a and having a ringed shape whose center is located at the optical axis. Slope section 10j of meniscus lens 10 is formed outside lens section 10a and having a ringed shape whose center is located at the optical axis.

In compound lens 6, under the condition that meniscus lenses 8, 10 are joined together, the central axes of convex lens section 8c and concave lens section 8d of meniscus lens 8 and the central axes of concave section 10c and convex section 10d of meniscus lens 10 agree with each other. The optical axes of all of the lens sections agree with each other.

As shown in FIG. 2, in image pickup lens unit 100, the outside diameter of compound lens 6 (meniscus lenses 8, 10) is smaller than the inside diameter of the side wall of holder 2, and there is formed space 60 (air gap) between the outer circumference surface of compound lens 6 and the inner wall surface of holder 2.

In non-lens section 10b of meniscus lens 10, step section 10e which inclines (inclining surface) and peripheral section 10f which is flat are formed. There is formed space 62 (air gap) between non-lens section 10b of meniscus lens 10 and bottom section 2a of holder 2.

Opening section 2b (stop 2d) of holder 2 forms an inclination section (inclining surface) inclining so as to make an opening smaller in a direction from the object side to the image side. In the inclination section of opening section 2b, there is formed peripheral section 2e having a ringed shape whose center is at the optical axis. Peripheral section 2e is in contact with convex lens section 10d of meniscus lens 10. Peripheral section 2e corresponds to a contacting section.

Convex lens section 10d is composed of effective aperture section 10h and non-effective aperture section 10i, Effective aperture section 10h is a part forming an area within the effective aperture, out of parts of convex lens section 10d. Non-effective aperture section 10i is a part formed outside effective aperture section 10h. Non-effective aperture section 10i is formed outside the effective aperture, and projects toward the image side more than non-lens section 10b.

In image pickup lens unit 100, peripheral section 2e is in contact with non-effective aperture section 10i in the direction perpendicular to the optical axis (the XY-axis direction) from the direction surrounding convex lens section 10d. Stop 2d regulates the movement of compound lens 6 in the XY-axis direction. Stop 2d represents a regulation section which regulates the movement of compound lens 6 in the XY-axis direction in the internal space of holder 2 and cover 4.

Projecting section 4e (projection) projecting downward is formed on top plate section 4a Projecting section 4e is in a ringed shape whose center is at the optical axis, and has a flat surface as the bottom surface. Flat surfaces of projecting section 4e and non-lens section 8b which is formed parallel with the direction perpendicular to the optical axis of meniscus lens 8 to be flat are in contact (surface contact) with each other in the optical axis direction. Projecting section 4e corresponds to a contacting section.

Projecting section 4e of cover 4 holds down compound lens 6 inside holder 2, and regulates the movement of compound lens 6 in the Z-axis direction. Projecting section 4e corresponds to a regulation section which regulates the movement of compound lens 6 in the Z-axis direction in the internal space of holder 2 and cover 4.

In opening section 4d (stop 4d) of cover 4, there is formed peripheral section 4f in a ringed shape whose center is at the optical axis. Peripheral section 4f is in contact (line contact) with convex lens section 8c of meniscus lens 8. Peripheral section 4f corresponds to a contacting section.

Convex lens section 8c is composed of effective aperture section 8h and non-effective aperture section 8i. Effective aperture section 8h is a part forming an area within the effective aperture, out of parts of convex lens section 8c. Non-effective aperture section 8i is a part formed outside effective aperture section 8h. Non-effective aperture section 8i is formed outside an area of the effective aperture, and projects toward the image side more than non-lens section 8b.

In image pickup lens unit 100, peripheral section 4f is in contact with non-effective aperture section 8i. Stop 4d regulates the movement of compound lens 6 in the XY-axis direction. Stop 4d represents a regulation section which regulates the movement of compound lens 6 in the XY-axis direction in the internal space of holder 2 and cover 4.

In the present specification, the left-light direction corresponds to the X-axis direction, the front-back direction corresponds to the Y-axis direction, and the up-down direction corresponds to the Z-axis direction, as shown in FIG. 1.

Herein, the structure of compound lens 6 is described by using meniscus lenses 8, 10 as an example, but the scope of the present invention is not usually limited to the structure. In other words, in an optical lens represented by compound lens 6 as an example includes various lens constructions as far as they satisfy desired optical properties, such as a lens construction composed of lenses other than a meniscus lenses.

The optical lens may be composed of three or more lenses. Further, the optical lens may naturally have a structure wherein separately molded lenses are joined together, and may have a structure formed by simultaneously molding plural lenses on a wafer to form a lens wafer, joining the lens wafers together and cutting the joined body into pieces. Accordingly, the form of the optical lens when it is observed from the optical-axis direction may not only be circle, but may also be rectangular which comes from the process of cut and separation into pieces or be other shapes.

Next, an assembling method of image pickup lens unit 100 will be described.

Figure 3:
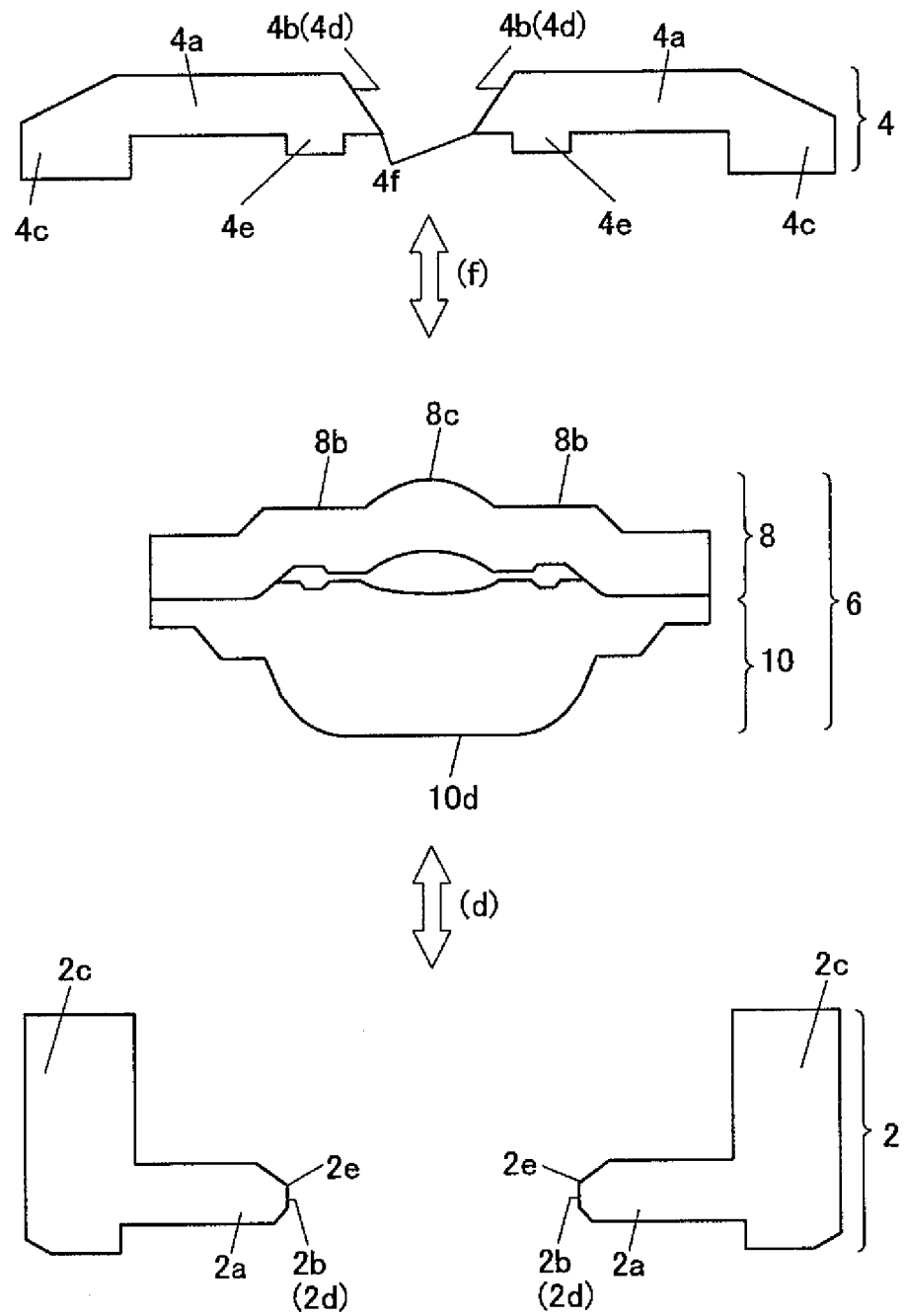
FIG. 3 shows a drawing schematically illustrating an assembling method of an image pickup lens unit.

First, compound lens 6 is arranged (housed) in holder 2 as shown in FIG. 3.

At that time, convex lens section 10d of meniscus lens 10 is arranged to come in contact with peripheral section 2e of holder 2 to regulate the movement of compound lens 6 in the XY-axis direction.

Next, holder 2 is arranged to be covered with cover 4.

In this case, peripheral section 4f of cover 4 is arranged to come in contact with convex lens section 8c of meniscus lens 8 to regulate the movement of compound lens 6 in the XY-axis direction, and projecting section 4e of cover 4 is arranged to come in contact with non-lens section 8b to regulate the movement of compound lens 6 in the Z-axis direction.

As described above, compound lens 6 is inserted into an internal space formed by holder 2 and cover 4. In opening section 2b of holder 2, there is formed a slope section having a ringed shape such that an opening becomes smaller in the direction from the object side to the image side. Thereby, in at the time of insert, meniscus lens 10 is inserted along the slope section while non-effective aperture section 10i (see FIG. 2) of convex lens section 10d of meniscus lens 10 is in contact with the slope section. Then, compound lens 6 is positioned in the XY-axis direction such that the optical axis of convex lens section 10d and the center of peripheral section 2e of the slope section are adjusted to agree with each other.

On the other hand, projecting section 4e of cover 4 comes in contact with compound lens 6 from the object-side direction. Thereby, compound lens 6 is positioned in the optical axis direction (the Z-axis direction). As the result, compound lens 6 is fixed under the condition that the optical axis of compound lens 6 and the center of opening section 2b (peripheral section 2e) of holder 2 agree with each other.

According to the above embodiment, peripheral section 2e and projecting section 4e are formed in holder 2 and cover 4, respectively, and peripheral section 2e and projecting section 4e are arranged to come in contact with convex lens section 10d and non-lens section 8b, respectively. Thereby, the movement of compound lens in the directions of X, Y and Z axes is restricted, and the position of compound lens 6 in the internal space of holder 2 and cover 2 is fixed. Thereby, a positional displacement between holder 2 and compound lens 6 is regulated regardless the surface accuracy of the outer circumference surfaces of non-lens sections 8b, 10b (flanges) of compound lens 6.

Though a method of manufacturing image pickup lens unit 100 is not especially limited, the following method is preferable as a method of manufacturing image pickup lens unit 100 in a point that it can be manufactured with high accuracy. Holder 2 and cover 4 are molded in a mold. In the mold, compound lens 6 is inserted in holder 2 which is not released from the mold, and holder 2 and cover 4 having a high positioning accuracy are joined together (manufacturing method using a so-called inter-mold assembly).

Further, as for an optical lens to be arranged inside holder 2 and cover 4, it is not limited to compound lens 6, and its manufacturing method is not restricted to a certain method.

Under the view point that a large number of small-sized lenses are manufactured simultaneously, it is preferable as the optical lens that, after a wafer lens array including plural lens sections are molded, the wafer lens array is cut into pieces to obtain the lenses.

As an example of a wafer lens array, the following structure is preferable in a case that it is structured as a glass molded body. A glass material is deposited on transfer surfaces of one mold out of a pair of molds including plural lens-section transfer surfaces, then, the other mold is pressed to the one mold to carry out press-molding. The glass material in this case may be arranged on respective transfer surfaces as preforms which have already been formed into an approximate shape, or may exist as liquid, be dropped on respective transfer surfaces, and be pressed in a cooling step. As another example of a wafer lens array, the following structure is preferable in a case that it is structured as an optical lens of a hybrid type formed of glass and resin. A molten energy-hardening resin such as thermo-hardening resin and photo-curable resin is arranged between a transparent glass substrate and a mold including plural lens-section transfer surfaces, and is pressure-molded.

[Variation 1]

Variation 1 is mainly different from the above descriptions (about a structure of image pickup lens unit 100 and a method of its assembly) in the following point, and others are same as the above descriptions.

Figure 4:
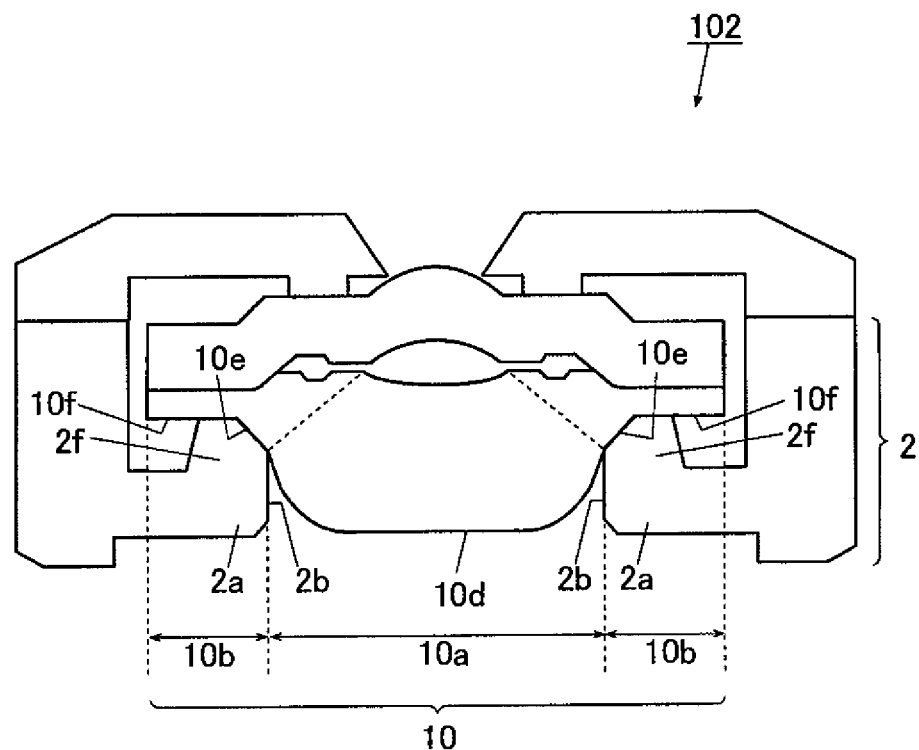
FIG. 4 shows a sectional view illustrating a schematic structure of Variation (1) of an image pickup lens unit.
Figure 4:
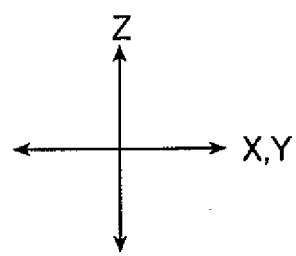

As shown in FIG. 4, also in image pickup lens unit 102, opening section 2b (stop 2d) of holder 2 forms an inclination section (inclining surface) inclining such that an opening becomes smaller in the direction from the object side to the image side. However, in the inclination section of opening section 2b, there is formed projecting section 2f (projection) which projects upward in place of peripheral section 2e. Projecting section 2f has a ringed shape whose center is at the optical axis. An upper part of projecting section has a shape corresponding to step section 10e of meniscus lens 10.

According to Variation 1, projecting section 2f comes in contact with step section 10e of a slope surface arranged in non-lens section 10b of meniscus lens 10, in the direction perpendicular to the optical axis (the XY-axis direction) and from the direction of surrounding convex lens section 10d. Projecting section 2f corresponds to a contacting section and regulates the movement of compound lens 6 in the XY-axis direction.

[Variation 2]

Variation 2 is mainly different from the above descriptions (about a structure of image pickup lens unit 100 and a method of its assembly) in the following point, and others are same as the above descriptions.

Figure 5:
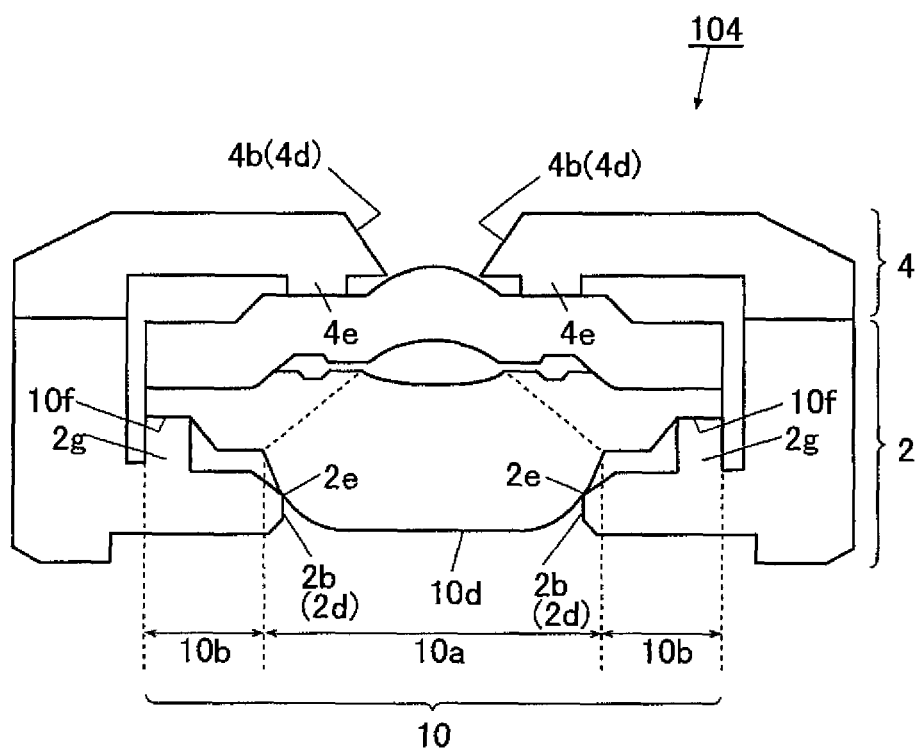
FIG. 5 shows a sectional view illustrating a schematic structure of Variation (2) of an image pickup lens unit.
Figure 5:
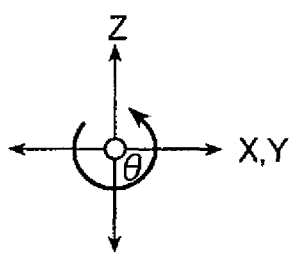

As shown in FIG. 5, also in image pickup lens unit 104, projecting section 2g (projection) which projects upward is formed on the bottom part of holder 2.

Projecting section 2g has a ringed shape whose center is at the optical axis, and is arranged outside peripheral section 2e. Projecting section 2g comes in contact with flat peripheral section 10f of meniscus lens 10 to regulate inclination of compound lens around the θ-axis direction. The θ-axis is defined by a perpendicular to the sheet of FIG. 5 as a central axis of the rotation. Projecting section 2g corresponds to a contacting section and also corresponds to a regulating section to regulate the inclination of compound lens 6 around the θ-axis direction and the inclination against the central axis of each of opening sections 2b and 4b.

According to Variation 2, projecting section 2g of holder 2 is arranged to be in contact with compound lens 6 at a position which is farther from the optical axis of compound lens 6 than projecting section 4e of cover 4, and further is arranged to be in contact with non-lens section 10b provided at the image side of meniscus lens 10 of compound lens 6, which can prevent compound lens from inclination.

[Variation 3]

Variation 3 is mainly different from the above descriptions (about a structure of image pickup lens unit 100 and a method of its assembly) in the following point, and others are same as the above descriptions.

Figure 6:
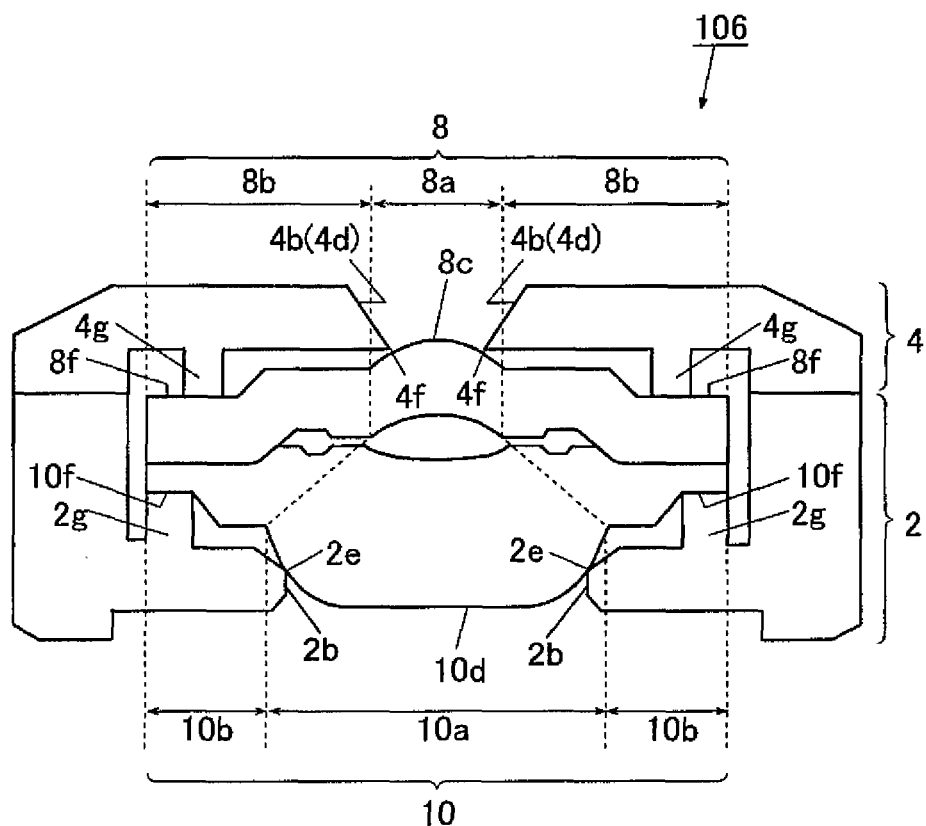
FIG. 6 shows a sectional view illustrating a schematic structure of Variation (3) of an image pickup lens unit.
Figure 6:
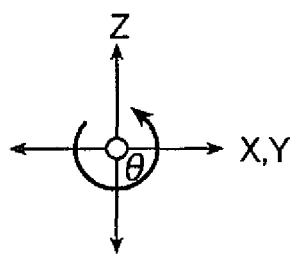

As shown in FIG. 6, in image pickup lens unit 106, projecting section 4g (projection) which projects downward is formed on the top plate section cover 4.

Projecting section 4g has a ringed shape whose center is at the optical axis, and is arranged outside peripheral section 4f. Projecting section 4g is arranged to be in contact with flat peripheral section 8f of meniscus lens 8 to regulate inclination of compound lens 6 around the θ-axis direction. The θ-axis is defined by a perpendicular to the sheet of FIG. 6 as a central axis of the rotation. Projecting section 4g corresponds to a contacting section and also corresponds to a regulating section to regulate the inclination of compound lens 6 around the θ-axis direction and the inclination against the central axis of each of opening sections 2b and 4b.

According to Variation 3, projecting section 4g of cover 4 is arranged to come in contact with compound lens 6 at a position which is farther from the optical axis of compound lens 6 than peripheral sections 2e, 4f of holder 2 and cover 4, and further is arranged to come in contact with non-lens section 8b provided at the object side of meniscus lens 8 of compound lens 6, which can prevent compound lens 6 from inclination.

Herein, both of projecting section 2g relating to Variation 2, and projecting section 2g and projecting section 4g relating to Variation 3 may be formed in the same embodiment or either of them may be formed in the same embodiment

[Variation 4]

Variation 4 is mainly different from the above descriptions (about a structure of image pickup lens unit 100 and a method of its assembly) in the following point, and others are same as the above descriptions.

Figure 7:
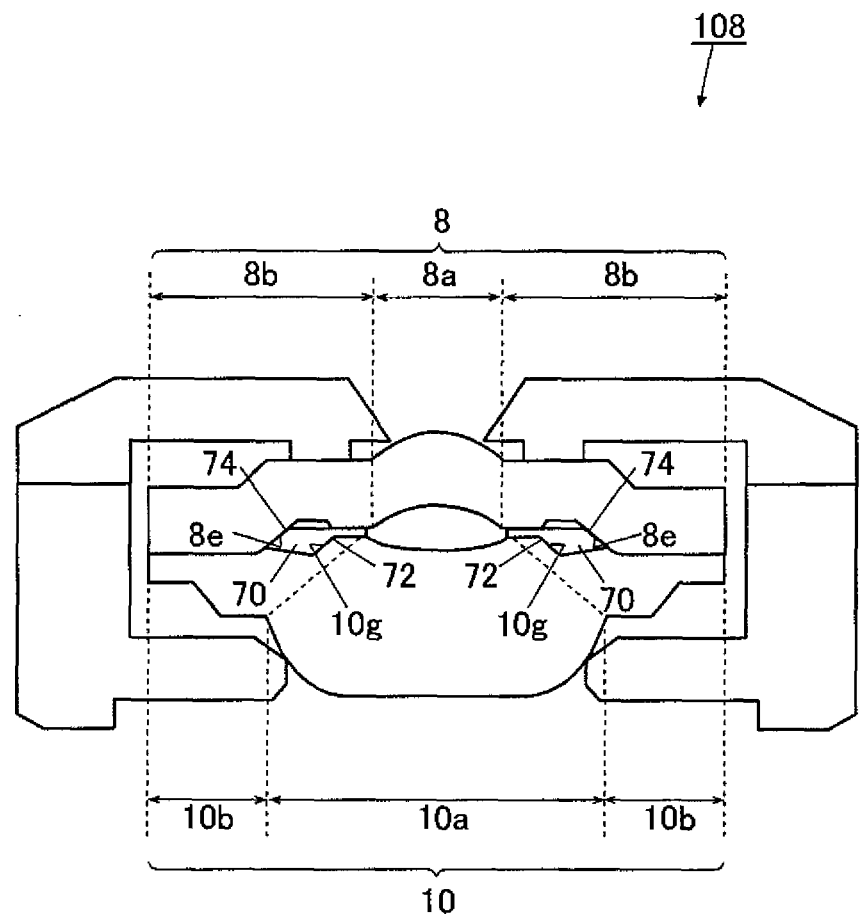
FIG. 7 shows a sectional view illustrating a schematic structure of Variation (4) of an image pickup lens unit

As shown in FIG. 7, in image pickup lens unit 108, stop member 70 is arranged between meniscus lens 8 and meniscus lens 10.

Stop member 70 is made of resin, and is preferably formed of a material with durability against a reflow processing.

In stop member 70, there are formed inclination section 72 (inclination surface) at the side of meniscus lens 10, and inclination section 74 (inclination surface) at the side of meniscus lens 8.

On the top surface of non-lens section 10b of meniscus lens 10, there is formed inclination section 10g (inclination surface) which inclines at the same angle to that of inclination section 72 of stop member 70.

Inclination section 72 of stop member 70 and inclination section 10g of meniscus lens 10 are in contact with each other (surface contact).

On the bottom surface of non-lens section 8b of meniscus lens 8, there is formed inclination section Se (inclination surface) which inclines at the same angle to that of inclination section 74 of stop member 70. Inclination section 74 of stop member 70 and inclination section Se of meniscus lens 8 are in contact with each other (surface contact).

In image pickup lens unit 108, inclination sections 72, 74 of stop member 70 are in contact with inclination sections 8e, 10g of meniscus lenses 8, 10, respectively. Stop member 70 regulates the movement of meniscus lenses 8, 10 in the XY-direction. Stop member 70 corresponds to a regulating member to regulate the movement of meniscus lenses 8, 10 in the XY-direction.

As a procedure of assembling image pickup lens unit 108, compound lens 6 is assembled previously, and then, compound lens 6 is joined to holder 2 and cover 4.

Figure 8:
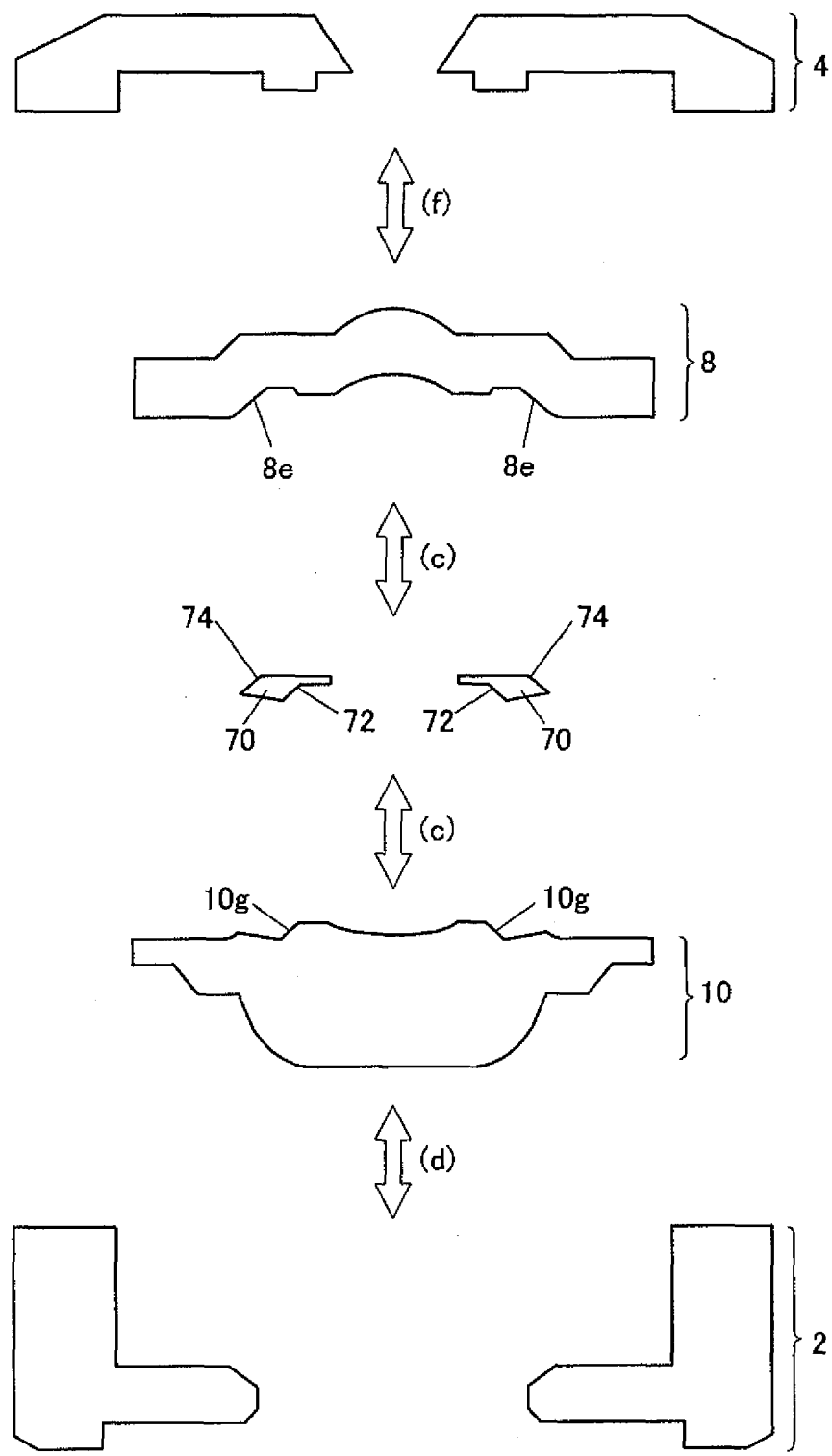
FIG. 8 shows a drawing for schematically illustrating an assembling method of an image pickup lens unit relating to Variation 4.

As shown in FIG. 8, each of meniscus lenses 8,10 and stop member 70 are prepared separately, and meniscus lenses 8, 10 are arranged on the basis of stop member 70. At that time, inclination section 10g of meniscus lens 10 is arranged to be in contact with inclination section 72 of stop member 70, and meniscus lens 10 is positioned with respect to stop member 70. Inclination section Se of meniscus lens 8 is arranged to be in contact with inclination section 74 of stop member 70, and meniscus lens 8 is positioned with respect to stop member 70.

In image pickup lens unit 108, stop member 70 is provided and meniscus lenses 8, 10 are positioned on the basis of the stop member, which can regulate the positional displacement between meniscus lenses 8, 10.

Though a method of manufacturing image pickup lens unit 108 relating to Variation 4 is not especially limited similarly to the image pickup lens unit 100, the following method is preferable as a method of manufacturing image pickup lens unit 107 in a point that it can be manufactured with high accuracy. Holder 2 and cover 4 are molded in a mold. In the mold, compound lens 6 is inserted in holder 2 which is not released from the mold, and holder 2 and cover 4 having a high positioning accuracy are joined together (manufacturing method using a so-called inter-mold assembly).

Holder 2, cover 4 and compound lens 6 may be assembled by any one of the following assembling methods.

[Assembling Method 1]

Figure 9:
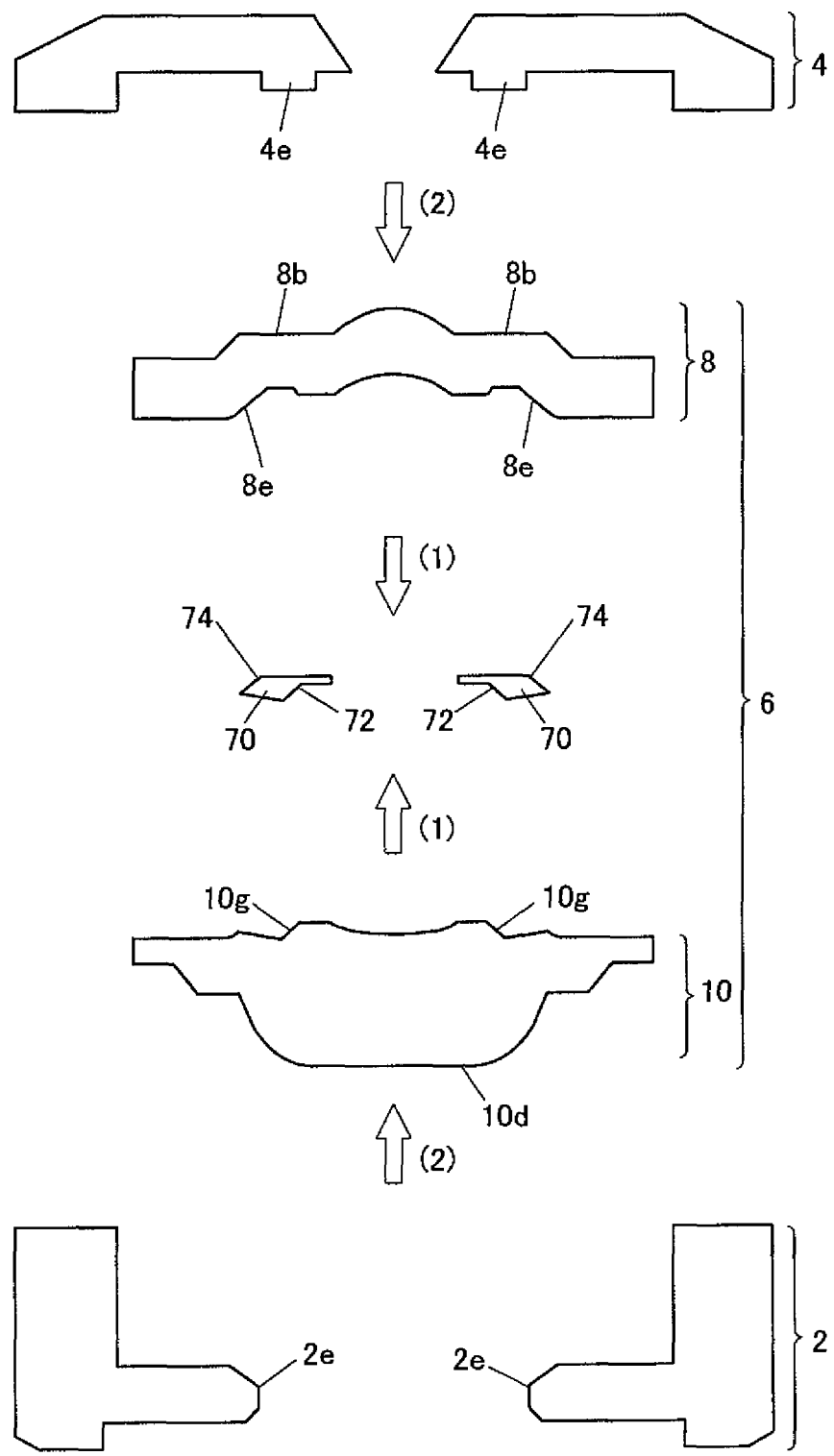
FIG. 9 shows a drawing for schematically illustrating the assembling method (1) of an image pickup lens unit relating to Variation 4.

As for the main part of Assembling method 1, as shown in FIG. 9, holder 2, cover 4, meniscus lenses 8, 10, and stop member 70 are prepared separately. (1) Meniscus lenses 8, 10 are arranged on the basis of stop member 70. (2) Holder 2 and cover 4 are arranged on the basis of compound lens 6.

In the step of (1), inclination section 10g of meniscus lens 10 is arranged to be in contact with inclination section 72 of stop member 70, to position meniscus lens 10 with respect to stop member 70. Inclination section 8e of meniscus lens 8 is arranged to be in contact with inclination section 74 of stop member 70, to position meniscus lens 8 with respect to stop member 70.

As for the step of (2), peripheral section 2e of holder 2 is arranged to be in contact with convex lens section 10d of compound lens 6, to position holder 2 with respect to compound lens 6. Projecting section 4e of cover 4 is arranged to be in contact with non-lens section 8b of compound lens 6, to position cover 4 with respect to compound lens 6.

In the main part of Assembling method 1, meniscus lenses 8, 10, holder 2 and cover 4 are sequentially arranged on the first basis of stop member 70.

[Assembling Method 2]

Figure 10:
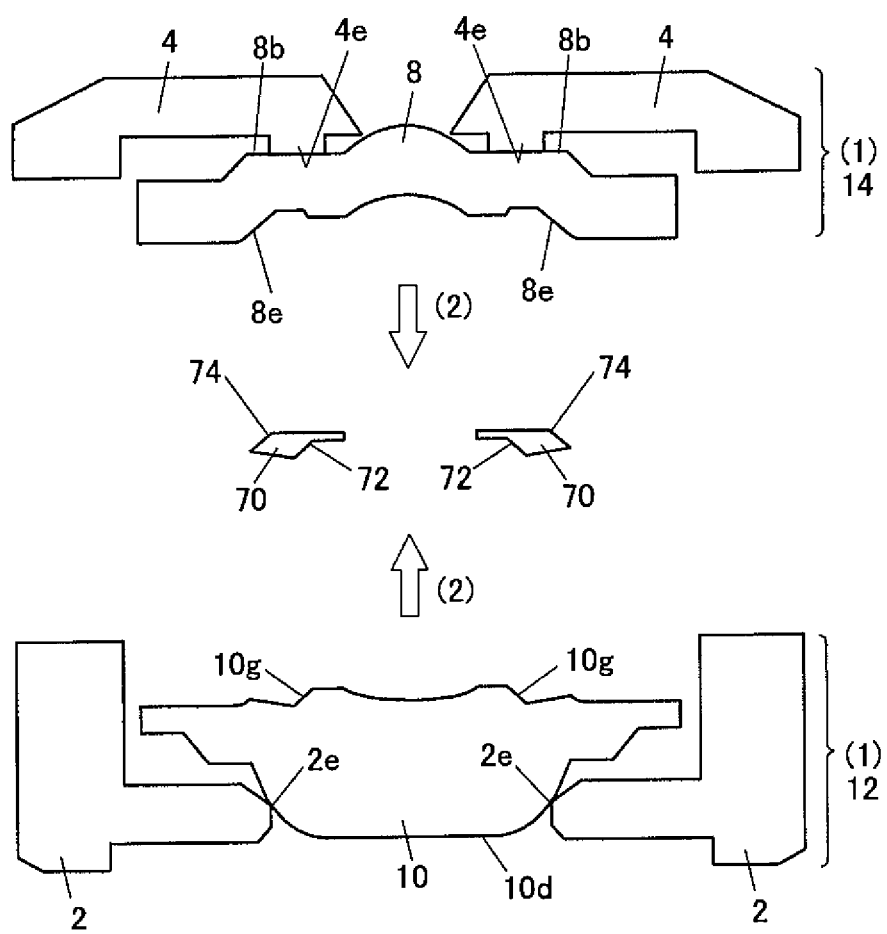
FIG. 10 shows a drawing for schematically illustrating the assembling method (2) of an image pickup lens unit relating to Variation 4.

In Assembling method 2, as shown in FIG. 10, (1) layered bodies 12, 14 are formed, and (2) complex bodies 12, 14 are arranged on the basis of stop member 70.

In the step of (1), peripheral section 2e of holder 2 and convex lens section 10d of meniscus lens 10 come in contact with each other and are positioned, to form complex body 12. Projecting section 4e of cover 4 and non-lens section 8b of meniscus lens 8 come in contact with each other and are positioned, to form complex body 14.

In the step of (2), inclination section 10g of meniscus lens 10 is arranged to be in contact with inclination section 72 of stop member 70, to position complex body 12 with respect to stop member 70. Inclination section 8e of meniscus lens 8 is arranged to be in contact with inclination section 74 of stop member 70, to position complex body 14 with respect to stop member 70.

In Assembling method 2, complex bodies 12, 14 are arranged on the basis of stop member 70.

[Assembling Method 3]

Figure 11:
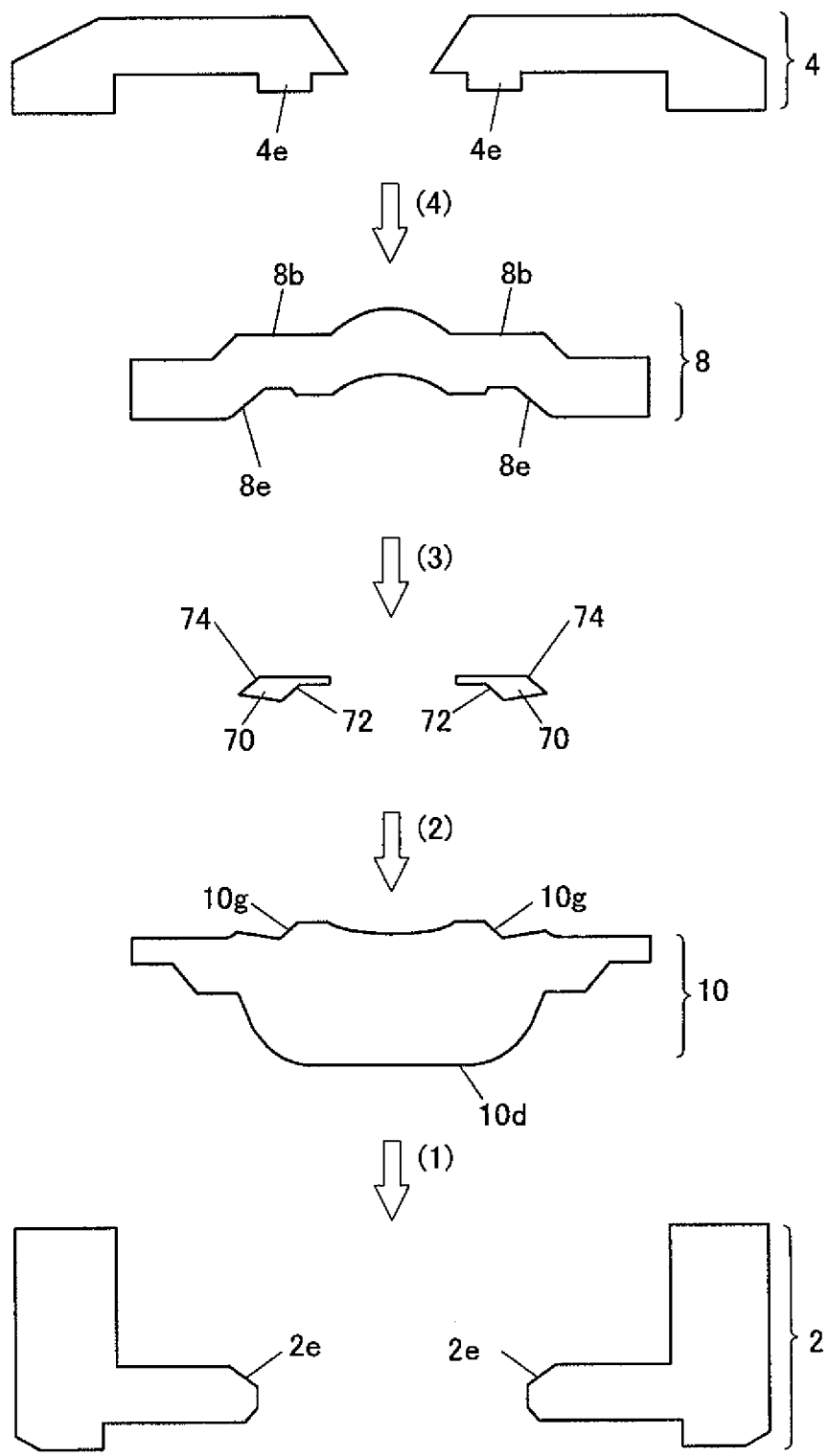
FIG. 11 shows a drawing for schematically illustrating the assembling method (3) of an image pickup lens unit relating to Variation 4.

As for the main part of Assembling method 3, as shown in FIG. 11, holder 2, cover 4, meniscus lenses 8, 10, and stop member 70 are prepared separately, (1) meniscus lens 10 is arranged on the basis of holder 2, (2) stop member 70 is arranged on the basis of meniscus lens 10, (3) meniscus lens 8 is arranged on the basis of stop member 70 and (4) cover 4 is arranged on the basis of meniscus lens 8.

In the step of (1), convex lens section 10d of meniscus lens 10 is arranged to be in contact with peripheral lens section 2e of holder 2, to position meniscus lens 10 with respect to holder 2.

In step (2), inclination section 72 of stop member 70 is arranged to be in contact with inclination section 10g of meniscus lens 10, to position stop member 70 with respect to meniscus lens 10.

In step (3), inclination section 8e of meniscus lens 8 is arranged to be in contact with inclination section 74 of stop member 70, to position meniscus lens 8 with respect to stop member 70.

In the step (4), projecting section 4e of cover 4 is arranged to be in contact with non-lens section 8b of meniscus lens 8, to position cover 4 with respect to meniscus lens 8.

In Assembling method 3, meniscus lens 10, stop member 70, meniscus lens 8, and cover 4 are sequentially arranged on the first basis of holder 2.

In the present embodiments (including Variations 1 to 4), the construction of holder 2 may be traded with the construction of cover 4.

Reference Signs List

2 Holder
2a Bottom section
2b Opening section
2c Side section (Side wall)
2d Stop
2e Peripheral section
2f Projecting section
2g Projecting section
2h Opening section
4 Cover
4a Top plate section
4b Opening section
4c Side section (Side wall)
4d Stop
4e Projecting section
4f Peripheral section
4g Projecting section
6 Lens unit
8 Meniscus lens
8a Lens section
8b Non-lens section (Flange)
8c Convex lens section
8d Concave lens section
8e Inclination section
8h Effective aperture section
8i Non-effective aperture section
8j Slope section
10 Meniscus lens
10a Lens section
10b Non-lens section (Flange)
10c Concave lens section
10d Convex lens section
10e Step section
10f Peripheral section
10g Inclination section
10h Effective aperture section
10i Non-effective aperture section
10j Slope section
12, 14 Complex bodies
20 Mold
22 Movable mold
24 Fixed mold
26 Convex section
28 Holder molding section
30 Concave section
32 Cover molding section
40 Jig
42 Concave section
44 Storage section
50 Bonding jig
52 Concave section 54 Injecting hole
60, 62 Space
70 Stop member
72, 74 Inclination sections
100, 102, 104, 106, 108 Image pickup lens units

The invention claimed is:

1. An image pickup lens unit comprising:
an image pickup lens; and
an exterior body covering the image pickup lens from outside and including a holder and a cover as structural elements,
wherein the image pickup lens comprises:
a first lens section including an area from an optical axis to an effective aperture thereof, and a first non-lens section arranged outside the first lens section, which are arranged on a surface closest to an object side in the image pickup lens, and
a second lens section including an area from the optical axis to an effective aperture thereof, and a second non-lens section arranged outside the second lens section, which are arranged on a surface closest to an image side in the image pickup lens,
wherein the image pickup lens is positioned in the exterior body by arranging an outer circumference surface of the image pickup lens with a gap between the outer circumference surface and an inner surface of the exterior body and by making the exterior body in contact with the second lens section and the surface closest to the object side which are arranged inside the exterior body, and movement of the image pickup lens is regulated in a direction perpendicular to the optical axis by making the exterior body in contact with the second lens section.

2. The image pickup lens unit of claim 1,
wherein the second lens section comprises a projection part, at least a part of which projects more than the second non-lens section toward the image side,
wherein an opening section is formed on the image side of the exterior body, and
wherein a peripheral section of the opening section is in contact with the projection part of the second lens section.

3. The image pickup lens unit of claim 1, wherein the image pickup lens is a lens unit formed by joining a plurality of lenses together to be one body.

4. The image pickup lens unit of claim 1, wherein the image pickup lens consists of a single lens.

5. The image pickup lens unit of claim 1, wherein the image pickup lens is a lens unit comprising two lenses joined together to be one body.

6. The image pickup lens unit of claim 5,
wherein the image pickup lens comprises:
a first lens section including an area from an optical axis to an effective aperture thereof and, a first slope section arranged outside the lens section and having a ringed shape whose center is located at the optical axis, the first lens section and the first slope section being arranged on an image-side surface of a lens arranged at an object side of the image pickup lens, and
a second lens section including an area from the optical axis to an effective aperture thereof, and a second slope section arranged outside the lens section and having a ringed shape whose center is located at the optical axis, the second lens section and the second slope section being arranged on an object-side surface of a lens arranged at an image side in the image pickup lens, and
wherein the first slope section and the second slope section are joined together.

7. The image pickup lens unit of claim 5, wherein the two lenses of the image pickup lens are joined together through a stop member.

8. The image pickup lens unit of claim 1,
wherein the image pickup lens is formed of a single molded glass lens or a plurality of molded glass lenses, and
wherein the holder and the cover are formed of resin.

9. The image pickup lens unit of claim 1, wherein each of the image pickup lens, the holder and the cover is formed of a material having durability against a reflow processing by which electronic parts are mounted on a circuit board.

10. The image pickup lens unit of claim 1, wherein the second lens section contacts the exterior body such that, at a point of contact between the second lens section and the exterior body, the exterior body is farther from the optical axis than the second lens section in a direction perpendicular to the optical axis.

11. An image pickup lens unit comprising:
an image pickup lens;
a holder holding the image pickup lens; and
a cover covering the image pickup lens,
wherein the image pickup lens comprises:
a first lens section including an area from an optical axis to an effective aperture thereof and including a part projecting at least toward an object side at an outside of the effective aperture thereof, and a first non-lens section arranged outside the first lens section, the first lens section and the first non-lens section being arranged on a surface closest to an object side of the image pickup lens, and
a second lens section including an area from the optical axis to an effective aperture thereof which is larger than the effective aperture of the first lens section and includes a part projecting at least toward an image side at an outside of the effective aperture thereof, and a second non-lens section arranged outside the second lens section, the second lens section and the second non-lens section being arranged on a surface closest to an image side in the image pickup lens,
wherein the holder comprises:
a first opening section including a first contacting section and an inclining surface, the first contacting section having a ringed shape and coming in contact in a direction perpendicular to the optical axis from outside with a part projecting more than the second non-lens section toward the image side in the second lens section so as to regulate movement of the image pickup lens in a direction perpendicular to the optical axis, the inclining surface inclining so as to make an opening smaller in a direction from the object side to the image side, and
a second opening section having a size such that the image pickup lens can be inserted into the holder through the second opening section,
wherein the cover comprises:
a third opening section for making light enter the image pickup lens, and
a second contacting section having a ringed shape and coming in contact in an direction of the optical axis with an area on a surface at the object side of the first lens section, the area being at an outside of the effective aperture of the first lens section, and
wherein a center of the first contacting section agrees with the optical axis of the image pickup lens at an inside of the holder and the cover.

12. The image pickup lens unit of claim 11,
wherein the first contacting section is in contact with the image pickup lens at a position which is farther from the optical axis of the image pickup lens than the second contacting section, and
wherein at least one of the holder and the cover comprises a third contacting section which comes in contact with the first non-lens section or the second non-lens section, and
wherein the third contacting section regulates an arrangement of the image pickup lens in the holder and the cover so as not to be inclined from center axes of the first opening section and the second opening section.

13. The image pickup lens unit of claim 11,
wherein the second contacting section comprises a flat surface,
wherein the first non-lens section is formed of a flat surface which is perpendicular to the optical axis of the image pickup lens, and
wherein the flat surface of the second contacting section and the flat surface of the first non-lens section are in contact with each other.

14. The image pickup lens unit of claim 11, wherein an air gap is formed between an outer side surface of the image pickup lens and an inner wall formed by the holder and the cover.

15. The image pickup lens unit of claim 11, wherein the third opening section is in contact with an area outside the effective aperture of the first lens section and forms a stop for restricting a light amount of an incident light.

16. The image pickup lens unit of claim 11, wherein the image pickup lens is a lens unit comprising two lenses joined together to be one body.

17. An image pickup lens unit comprising:
an image pickup lens;
a holder holding the image pickup lens; and
a cover covering the image pickup lens,
wherein the image pickup lens comprises:
   a first lens section including an area from an optical axis to an effective aperture thereof and including a part projecting at least toward an object side at an outside of the effective aperture thereof, and a first non-lens section arranged outside the first lens section, the first lens section and the first non-lens section being arranged on a surface closest to an object side of the image pickup lens, and
   a second lens section including an area from the optical axis to an effective aperture thereof which is larger than the effective aperture of the first lens section and includes a part projecting at least toward an image side at an outside of the effective aperture thereof, and a second non-lens section arranged outside the second lens section, the second lens section and the second non-lens section being arranged on a surface closest to an image side in the image pickup lens,
wherein the holder comprises:
   a first opening section including a first contacting section and an inclining surface, the first contacting section having a ringed shape and coming in contact in a direction perpendicular to the optical axis from outside with the second lens section so as to regulate movement of the image pickup lens in a direction perpendicular to the optical axis, the inclining surface inclining so as to make an opening smaller in a direction from the object side to the image side, and
   a second opening section having a size such that the image pickup lens can be inserted into the holder through the second opening section,
wherein the cover comprises
   a third opening section for making light enter the image pickup lens, and
   a second contacting section having a ringed shape and coming in contact in an direction of the optical axis with an area on the surface closest to the object side in the image pickup lens, the area being at an outside of the effective aperture of the surface closest to the object side, and
wherein a center of the first contacting section agrees with the optical axis of the image pickup lens at an inside of the holder and the cover.

18. The image pickup lens unit of claim 17,
wherein the first contacting section is in contact with the image pickup lens at a position which is farther from the optical axis of the image pickup lens than the second contacting section,
wherein at least one of the holder and the cover comprises a third contacting section which comes in contact with the first non-lens section or the second non-lens section, and
wherein the third contacting section regulates an arrangement of the image pickup lens in the holder and the cover so as not to be inclined from center axes of the first opening section and the second opening section.

19. The image pickup lens unit of claim 17,
wherein the second contacting section comprises a flat surface,
wherein the first non-lens section is formed of a flat surface which is perpendicular to the optical axis of the image pickup lens, and
wherein the flat surface of the second contacting section and the flat surface of the first non-lens section are in contact with each other.

20. The image pickup lens unit of claim 17, wherein an air gap is formed between an outer side surface of the image pickup lens and an inner wall formed by the holder and the cover.

21. The image pickup lens unit of claim 17, wherein the third opening section is in contact with an area outside the effective aperture of the first lens section and forms a stop for restricting a light amount of an incident light.

22. The image pickup lens unit of claim 17, wherein the image pickup lens is a lens unit comprising two lenses joined together to be one body.

* * * * *